Dec. 10, 1935.  A. URFER  2,023,825
ALTIMETER
Filed Feb. 25, 1932  2 Sheets-Sheet 1
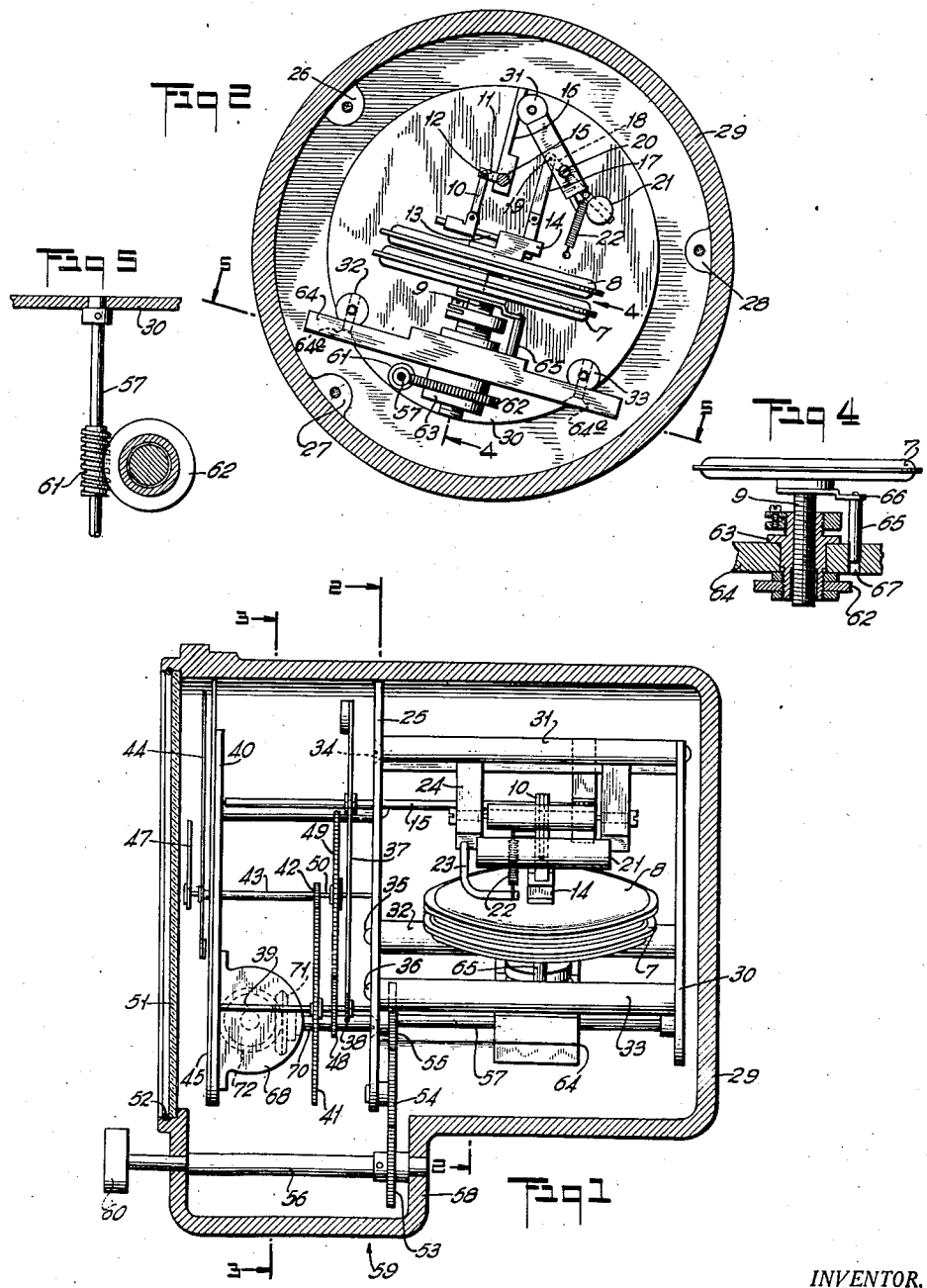
INVENTOR.
ADOLF URFER.
BY Stephen Cerstvik.
ATTORNEY.

Dec. 10, 1935.  A. URFER  2,023,825
ALTIMETER
Filed Feb. 25, 1932  2 Sheets-Sheet 2

INVENTOR.
ADOLF URFER.
BY Stephen Cerstvik.
ATTORNEY.

Patented Dec. 10, 1935

2,023,825

UNITED STATES PATENT OFFICE 2,023,825

ALTIMETER

Adolf Urfer, Richmond Hill, N. Y., assignor to Bendix Aviation Corporation, South Bend, Ind., a corporation of Delaware Application February 25, 1932, Serial No. 595,169

23 Claims. (Cl. 73—4)

The present invention relates to indicating instruments, and more particularly to sensitive instruments for indicating the altitude of an aircraft.

In devices of the above type, it is desirable that they be capable of adjustment under one condition for a second and predetermined condition, and so that they will indicate when said predetermined condition occurs or is reached.

In altimeters, and particularly in sensitive altimeters embodying a plurality of scales and cooperating pointers for indicating altitude in hundreds and thousands of feet, this feature may be embodied therein in such a manner that the altimeter can be set at an airport having one pressure altitude with respect to sea level for a pressure altitude of another airport to and at which it is desired to fly and land, so that when the aircraft lands at the second airport the altimeter will indicate zero altitude, thereby providing the pilot with correct indications of the altitude of his craft with respect to the ground at the airport where he is going to land.

For purposes of illustration, assume that a pilot is going to fly from airport No. 1, the pressure altitude of which is 500 feet above sea level, to airport No. 2, the altitude of which is 1000 feet above sea level. If the altimeter is not provided with adjusting means (except for adjusting to indicate zero at the particular altitude at which the craft is at the time) then when he takes off from airport No. 1 and levels off to a flying altitude of 2000 feet (2500 feet above sea level) upon reaching a position over airport No. 2 his altimeter will still indicate 2000 feet, whereas his altitude above airport No. 2 is only 1500 feet. Thus, he would be led to believe he is higher than he actually is, and this would cause him to misjudge his landing in view of the fact that he would be on the ground when his altimeter would still indicate 500 feet altitude. Therefore, an adjustment must be provided in the altimeter whereby the latter can be set at airport No. 1 for the altitude of airport No. 2 and to indicate such altitude on the instrument, simultaneously causing relative movement between the pointers and their respective scales, so that when the aircraft reaches a position over airport No. 2 the altimeter will indicate the true altitude above the airport and will show zero when the plane reaches the ground.

Heretofore, various mechanisms have been provided for making an adjustment as described above, in which the complete indicating unit, including the amplification mechanism and the pressure-sensitive element, was rotatable with respect to its casing and the pointers, scales, and reference marks were rotatable with respect to each other and/or to the indicating mechanism. Such arrangements required complicated gear trains and were likely to cause confusion in readings because the reference marks indicated one thing on the scales while the pointers indicated another. Accordingly, one of the objects of the present invention is to provide a novel altimeter embodying novel adjusting and indicating means whereby the foregoing difficulties are eliminated and the set condition or altitude clearly indicated independently of the scales with which the pointers cooperate.

Another object of the invention is to provide in an indicating instrument, novel means whereby the instrument may be set for a predetermined condition and to indicate such condition upon its being reached and also to indicate the predetermined condition at the time that the instrument is set.

Another object is to provide in a sensitive altimeter, novel means whereby relative movement is produced between the scales and pointers for adjusting the altimeter so that it will produce a desired indication when a predetermined altitude is reached and for indicating such predetermined altitude when the setting is made.

A further object of the invention is to provide a novel sensitive altimeter embodying a plurality of scales and pointers relatively movable with respect to each other for indicating action and for setting to a predetermined condition so that a desired reading may be obtained from the scales when the predetermined condition is reached, and means separate from but functionally related to the scales and pointers for indicating in numbers the condition for which the instrument is set.

Still another object is to provide a novel instrument of the class described, which is relatively simple in construction without detracting from its efficiency in operation, and embodying relatively few parts, whereby the instrument may be manufactured economically on a production basis.

The above and other objects and advantages of the invention will appear more fully hereinafter from a consideration of the detailed description which follows, taken together with the accompanying drawings, wherein is illustrated one embodiment of the invention. It is to be expressly understood, however, that the drawings are only for the purpose of illustration and description, and are not designed as a definition of the limits of the invention, reference being had for this purpose to the appended claims.

In the drawings, wherein like reference characters refer to like parts throughout the several views, Fig. 1 is a longitudinal sectional view of the casing showing the functional relationship of the various elements of one form of device embodying the present invention;

Fig. 2 is a sectional view taken on line 2—2 of Fig 1;

Fig. 4 is a detailed view, partly in section taken on line 4—4 of Fig. 2 and showing the method of mounting the pressure-sensitive element for bodily movement thereof along its operating axis in adjusting the instrument;

Fig. 6 is a front view of the instrument embodying the present invention.

Figure 3:
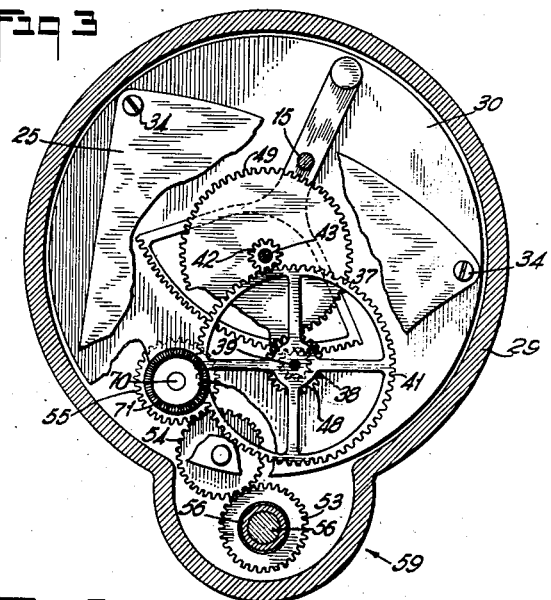
Fig. 3 is a sectional view taken on the line 3—3 of Fig. 1.
Figure 5:
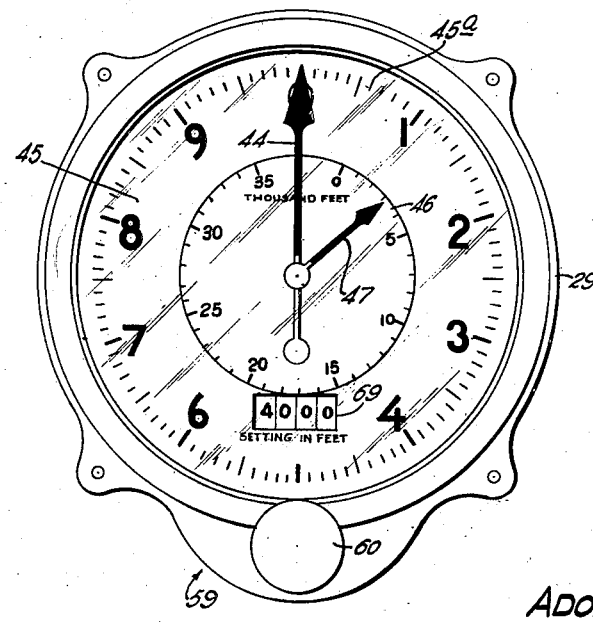
Fig. 5 is a detailed view, partly in section along line 5—5 of Fig. 2, of one form of means for causing bodily movement of the pressure-sensitive element as indicated in Fig. 4.

Referring to the drawings, and more particularly to Figs. 1, 2, and 3, the instrument embodying the present invention is shown in the form of an altimeter having an evacuated pressure-sensitive element which is adapted to expand and contract upon variations of pressure due to changes in altitude, an amplification mechanism for amplifying the relatively small movements of the pressure-sensitive element into readily discernible movements of a plurality of pointers over cooperating scales to indicate the altitude in feet or meters or in terms of barometric pressure if desired, the pointers being geared together in such a manner that one moves only a fraction of a revolution for one complete revolution of the other, the latter indicating the altitude in hundreds of feet and the former in thousands of feet, or in other units having the same or different ratios.

In the form shown, the pressure-sensitive element comprises one or more aneroid capsules, such as, for example, 7 and 8, carried by a relatively stationary supporting member 9 but which is capable of adjustment, as will be pointed out hereinafter. Means are provided for employing and amplifying the movements of the aneroid capsules upon actuation thereof due to changes in pressure to produce indications which, as stated hereinbefore, may be in terms of barometric pressure or of altitude in feet or meters. In the form shown, said means comprise a pair of links 10 and 11 pivotally connected at 12, the link 10 being connected to the aneroid capsule 8 through a temperature-compensating element 13 and a bracket 14. The link 11 is rigidly connected to a rockshaft 15 journaled in a member 16 for rocking movement upon actuation of the aneroid capsules 7 and 8. The bracket 14 is also connected to a pair of links 17 and 18 which are pivoted together at 19, the link 18 being in turn pivoted at 20. A counterweight 21 is carried by the link 18 and a spring 22 is also connected to link 18 and to a member 23 secured to or formed integral with a supporting member 24 so that the entire elastic system is balanced in order to prevent movement thereof due to vibrations, acceleration forces, etc. In other words, the rockshaft 15 is actuated only by the capsules 7 and 8 through the links 10 and 11 and not by any undesirable and/or extraneous forces. The rockshaft 15 is also journaled in a plate 25 which is secured to and within the casing in any suitable manner, as by means of screws (not shown) adapted to engage with a plurality of bosses 26, 27, and 28 circumferentially spaced about the interior of the instrument casing 29. The plate 25, together with a similar plate 30, form a mounting for the aneroid capsules and the amplification mechanism and are secured together in any suitable manner, as for example by means of spacing rods 31, 32, and 33 and screws 34, 35, and 36, as shown in Fig. 1.

The rockshaft 15 has secured thereto or formed integral therewith, a gear sector 37, which is arranged to mesh with a pinion 38, the latter being carried by a countershaft 39 journaled in the plate 25, and another plate 40 at the front of the casing. Secured to or formed integral with the shaft 39 is a relatively large gear 41 which meshes with a pinion 42 carried at one end of a hollow shaft 43 which extends through the plate 40 and has secured thereto a large pointer 44. The pointer 44 traverses a dial 45 which is secured to the plate 40 and upon which is engraved or etched a scale 45a, marked in hundreds of feet, for example. Concentric with the scale 45a is another scale 46 which is graduated in thousands of feet and has cooperating therewith a small pointer 47. In order that the pointer 47 shall move with respect to its scale 46 and with the pointer 44 in the ratio existing between scales 45a and 46, the pointers are geared together in such a manner that the pointer 47 moves only a fraction of a revolution for one complete revolution of pointer 44 and for this purpose another gear 48 is secured to or formed integral with the counter-shaft 39 and arranged to mesh with a relatively large gear 49, the gear 49 being secured to or formed integral with a pointer shaft 50 which is journaled in the plate 40 and which extends through the hollow pointer shaft 43 to actuate the small pointer 47.

A cover-glass 51 of some suitable transparent material, which may be other than glass, is secured to the open end of the casing 29 in any suitable manner such as by means of a clamping ring 52, so that the pointers 44 and 47 can be viewed therethrough in their cooperation with their respective scales 45a and 46.

It will be apparent from the foregoing that as the aneroid capsules 7 and 8 are actuated by barometric pressure, the rockshaft 15 is actuated through the links 10 and 11 to cause movement of the gear sector 37 and thereby operating the pointers 44 and 47 in the proper ratio through the gear trains 38, 41, 42 and 38, 48, 49, respectively. It will also be apparent that the pointers 44 and 47 will indicate the altitude with respect to barometric pressure or sea level and not the true altitude with respect to the ground; that is, the pointers would indicate zero only when the instrument is at sea level under normal conditions and therefore it is desirable that the instrument be capable of adjustment to indicate zero when the instrument is on the ground regardless of the altitude of the ground with respect to sea level. It is further desirable that the instrument be capable of adjustment under one condition for a second condition and to indicate when the second condition occurs or is reached. To this end novel means are provided for making such adjustment and, in the form shown, comprise means for causing relative movement between the pointers and their respective scales, so that the pointers will indicate zero when the instrument reaches the altitude for which it was set. Said means include a gear train comprising gears 53, 54, and 55, which are interposed between an actuating shaft 56 and a counter-shaft 57, the latter being journaled in the plates 25 and 30 and the former being journaled in the wall 58 of an enlarged portion 59 of the casing 29. The shaft 56 is arranged to be actuated from the front of the casing by means of a knob 60 whereby the counter-shaft 57 is rotated.

Means are now provided whereby rotation of the shaft 57 is caused to actuate the pointers 44 and 47 through the actuating and amplification mechanism which operates them during indicating action by the expansion and contraction of the aneroid capsules 7 and 8. Said means include actuating means for moving the aneroid capsules 7 and 8 bodily with respect to their support as, for example, along the operating axis thereof and in such a manner that the pointers are caused to move in the same way as when actuated by said capsules during indicating action. In the form shown, said means comprise a worm 61 secured to or formed integral with the counter-shaft 57 and arranged to mesh with a worm gear 62. The worm gear 62 is secured to or formed integral with an internally threaded member 63 journaled in a fixed cross member 64, the latter being secured to the spacing rods in any suitable manner as, for example, by screws 64a. The internally threaded member 63 is arranged for threaded engagement with the supporting member 9, which is in the form of a threaded shaft and which carries the aneroid capsules 7 and 8, as shown in detail in Fig. 4. It will be apparent that upon rotation of the worm gear 62 the internally threaded member 63 will also rotate by virtue of its fixed relation therewith and the threaded member 63 will in turn tend to rotate the threaded shaft 9 and hence the capsules 7 and 8.

It is desirable to utilize this tendency of the threaded shaft 9 to rotate, to impart longitudinal movement to the aneroid capsules along their operating axis and to this end means are provided for holding the shaft 9 against such rotation. In the form shown, said means comprise a pin 65 carried by a bracket 66 secured to the aneroid capsule 7 and extending into a hole 67 formed in the cross member 64. It will now be apparent that when rotation of the shaft 9 is prevented by means of the pin 65 said shaft will move longitudinally in one direction or the other within the internally threaded member 63, depending upon the direction of rotation of the latter, and will thereby bodily move the capsules 7 and 8. The bodily movement of the capsules will then be transmitted to the pointers 44 and 47 through the amplification mechanism and their respective gear trains in the same manner as when the capsules expand or contract due to barometric pressure. Relative movement may be caused between the pointers 44 and 47 and their respective scales to any degree which may be desired, so that said pointers will produce a desired indication on the scales as, for example, a zero reading, when the desired condition or pressure level altitude for which the instrument is set has been reached.

It is also desirable that the condition for which the instrument is to be set may be indicated at the time the setting is being made so that such indication may be employed as a reference point. In other words, if it is desired to set the pointers so that they will indicate zero when a certain altitude is reached it is essential that such condition be indicated at the time the setting is being made. After the desired condition is indicated at the time of setting, it is also essential that it remain unchanged during the actuation of the pointers by the change from the first condition to the second condition and that the pointers operate independently to indicate when the desired condition is reached, as for example, by producing a zero indication upon reaching an airport having a certain pressure level altitude the latter of which may change from day to day due to changes of barometric pressure. To this end means are provided whereby the indication of the desired condition for which the instrument is set is produced simultaneously with the bodily movement of the aneroid capsules to cause relative movement between the pointers and their scales. In the form shown, said means comprise a counter 68 carried by the plate 40 and arranged so that the number-carrying dials thereof are visible through an opening 69 provided in the dial 45 at any convenient point, as for example, just below the scale 46.

The number-carrying dials of the counter, which in the present instance are marked in feet, are actuated simultaneously with the setting of the pointers by means of the knob 60 through an extension 70 of the counter-shaft 57, which extension carries a beveled pinion 71 meshing with a bevel gear 72. The first two number-carrying dials from the right of the counter 68, as viewed in Fig. 6, i. e., the "units" and "tens" dials, are locked together for simultaneous rotation and the "units" dial has all zeros marked on it when the counter is calibrated to indicate the preset altitude in feet, it being sufficient to indicate the altitude within ten feet. Thus, the two right end dials make ten revolutions while the "hundreds" dial makes one revolution and the "thousands" dial makes a tenth of a revolution.

It will be apparent from the foregoing that when the knob 60 is actuated to adjust the instrument for a desired condition, relative movement is caused between the pointers and their respective scales through their respective gear trains and through the amplification mechanism by the bodily movement of the aneroid capsules 7 and 8 through the gear train 53, 54, 55 and the worm 61 and worm gear 62. Simultaneously with the bodily movement of the aneroid capsules the extension 70 of the counter-shaft 57 is also actuated, thereby causing the beveled pinion 71 to drive the bevel gear 72, thereby rotating the number-carrying dials of the counter to indicate the condition for which the instrument has been set. Thereafter, the pointers are operated independently of the counter through their respective gear trains and through the amplification mechanism to produce the required indication on the scales 45a and 46 when the condition occurs or has been reached for which the instrument has been set and which condition is indicated on the counter 68. For example, assume that the instrument is at sea level under normal barometric pressure, at which time the pointers 44 and 47 indicate zero on their respective scales 45a and 46, and the number-carrying dials of the counter also all indicate zero. If the pilot of a craft on which the instrument is mounted now desires to fly to a landing field which has a pressure level altitude of 4000 feet, for example, he now rotates the knob 60 until 4000 feet is indicated on the counter, at which time relative movement is also caused between the pointers 44 and 47 and their respective dials, so that they no longer indicate zero on their scales. The relative position of the pointers and their scales is now such that they indicate 4000 feet away from zero but will indicate zero when the pilot reaches the field for which he is flying and for which the instrument has been adjusted. The setting of the counter, however, remains unchanged during the indicating action of the pointers and until the instrument is again adjusted by means of the knob 60.

There is thus provided a novel indicating device which may be set under one condition for a second condition so that it will indicate when the second condition occurs or is reached and which also indicates the condition for which it has been set, independently of the indicating action of the device, and, as pointed out hereinbefore, the invention is particularly suitable for use in a sensitive altimeter whereby a pilot can set his instrument at a flying field having one pressure level altitude so that it will indicate zero when he reaches a second flying field whose pressure level altitude is different from that of the first flying field and which altitude can be set into the instrument as a positive indication.

Although only one embodiment of the invention has been illustrated and described, other changes and modifications, which will now appear to those skilled in the art, may be made without departing from the scope of the invention. For example, the counter may be replaced by another type of indicator which is adapted for simultaneous actuation by the knob 60 when the adjustment is made between the pointers and scales. It is also obvious that the reference scale or counter and the indicating scales may be calibrated in terms of barometric pressure as well as in feet or meters. Reference is therefore to be had to the appended claims for a definition of the limits of the invention.

What is claimed is:

1. A sensitive altimeter including a pressure-sensitive element, a plurality of scales, individual pointers for the scales, a counter separate from but functionally related to said scales and having a plurality of interconnected numbering elements operatively connected with said pointers and pressure-sensitive element and adapted to be set for and to indicate a predetermined altitude in whole numbers of feet or meters, drive means interconnecting the pointers and pressure-sensitive element to cause an indicating movement of the pointers by said pressure-sensitive element according to their scales, and actuator means to cause a relative movement between the pointers and scales and to simultaneously set the numbering elements of said counter for indicating the predetermined altitude so that a predetermined relation is established between the pointers and scales and a desired indication obtained on the scales when the predetermined altitude is reached.

2. An indicator comprising a movable actuating element mounted for bodily movement along its operating axis, relatively stationary scale means, a pointer, reference indicating means separate from but functionally related to said scale means and pointer for indicating a desired condition, and unitary means for operating said reference means to indicate any desired condition and for simultaneously moving the pointer and actuating element in coordination with said reference means so that a predetermined relation is established between the pointer and the scale means.

3. An indicating device including circular scale means, a plurality of pointers cooperating with said scale means, one of said pointers making one revolution for a fraction of a revolution of the other pointer, reference indicating means functionally associated with said pointers and scale means but positionally and indicatively independent thereof, means for moving the pointers and the reference means in predetermined functional ratio for an initial setting of the device, and actuating means for operating the pointers independently of said reference means for indicating movement with respect to said scale means from the set position, said actuating means being mounted for bodily movement along its operating axis and connected to the means for moving the pointers and adapted to move with said pointers in setting the device.

4. In an altimeter having pointer means and scale means, the combination of setting means for establishing a predetermined relation between said pointer means and scale means for producing a desired indication when a predetermined altitude is reached, and a counter means separate from but functionally related to said scale means and having a plurality of interconnected numbering elements connected to and operated by said setting means for indicating in numbers the predetermined altitude for which the relation between the pointer and scale means has been set.

5. In an altimeter having pointer means and scale means, the combination of setting means for establishing a predetermined relation between said pointer means and scale means for producing a desired indication when a predetermined altitude is reached, a counter separate from but functionally related to said scale means and having a plurality of interconnected numbering elements for indicating in numbers the predetermined altitude for which the relation between the pointer and scale means has been set, and means included in said setting means and forming a part thereof for moving the numbering elements of said counter and simultaneously causing relative movement between said pointer and scale means for setting the same.

6. An altimeter comprising in combination, circular non-rotatable scale means, a plurality of pointers, one of said pointers making a complete revolution for a fraction of a revolution of the other pointer, reference indicating means operative with the pointers during setting action but not operative therewith during indication action and separate from but functionally related to said scale means for setting to indicate a predetermined altitude, means to move the pointers and the reference means for an initial setting of the altimeter, and a pressure sensitive element for operating the pointers independently of the reference means for indicating movement with respect to said scale means, said actuating means being mounted for bodily setting movement along its indicating axis and connected to the means for moving the pointers and reference means for movement therewith in the setting of the altimeter.

7. An altimeter including a circular, non-rotatable scale, a pointer movable in concentric relation with the scale, reference means movable with the pointer for setting but having no indicative relation with the scale to indicate a predetermined altitude, adjusting means to move the pointer and the reference means so that a predetermined relation is established between the pointer and scale and indicated by said reference means for an initial setting of the altimeter, and a pressure-sensitive element to operate the pointer independently of the reference means for indicating movement with respect to said scale, said pressure-sensitive element being mounted for bodily movement along its operating axis and connected to the adjusting means for movement with the pointer and reference means and to move said pointer during the setting action.

8. An indicating device including a movable actuator mounted for bodily setting movement along the axis of its indicating movement, a relatively stationary scale, a pointer operated by the actuator, reference means movable and coordinated with the pointer but separate from the scale for setting to indicate a predetermined condition when a certain relation has been established between the pointer and scale, and adjusting means for bodily moving the actuator, the pointer and the reference means to establish the desired relation between the pointer and scale and to indicate the predetermined condition, said adjusting means including manually operated means in proximity to the front of the device, and said actuator having means operated by said manual means for bodily moving said actuator during setting.

9. An altimeter including a pressure-sensitive element mounted for bodily setting movement in the general direction of the axis of its indicating movement, scale means, pointer means, reference means movable with said pointer means during setting of the altimeter but remaining stationary during indicating action, said reference means being indicatively separate from the scale means for setting and arranged to indicate a predetermined altitude in numbers, and means coacting with the pointer means, the pressure-sensitive element and the reference means to cause them to move simultaneously in the setting of the altimeter to establish a predetermined relation between the scale means and pointer means for the predetermined altitude and to indicate the latter.

10. An altimeter including a pressure-sensitive element mounted for bodily setting movement along the axis of its indicating movement, scale means, pointer means, transmission means operated by the pressure-sensitive element to actuate the pointer means during setting and indicating action, reference means separate from the scale means and arranged to be set for indicating in numbers a predetermined altitude separately from said scale means, and means to simultaneously move the pressure-sensitive element, pointer means and reference means for setting the altimeter to the predetermined altitude thereby establishing a predetermined relation between the pointer means and scale means and indicating said predetermined altitude, said pointer means moving at a different rate than the pressure-sensitive element and in predetermined relation to the scale means.

11. An indicating device including an actuator bodily movable substantially in the general direction of its indicating movement for setting the same, a shaft operated by the actuator for normal indicating action, a second shaft, a relatively stationary mounting for the same, pointers for the respective shafts, a relatively stationary dial, reference means separate from but functionally related to the dial and arranged for setting with the pointers to indicate a predetermined condition in numbers and separately from said dial and pointers, means interconnecting the shafts to cause the first shaft to rotate the second shaft in synchronism for setting and for normal indicating action with respect to the dial, and means for bodily moving said actuator along its operating axis to set the device.

12. An indicating device including an actuator bodily movable along the axis of its indicating movement, concentric shafts operated thereby, pointers for the respective shafts, scale means for the pointers, reference indicating means separate from the scale means and arranged to be set with the pointers for indicating a predetermined condition independently of said scale means, a gear train interconnecting the shafts, said gear train including gears secured to the shafts, stationary means independent of the actuator for mounting the intermediate gears of the gear train, said actuator being operatively connected to said reference means whereby the pointers are turned with respect to each other and in predetermined relation to the scale means during setting, and said reference means being simultaneously actuated to indicate the predetermined condition, and means for bodily moving said actuator along its operating axis to set the device.

13. An altimeter including a pressure-sensitive element mounted for bodily setting movement along the axis of its indicating movement, scale means therefor, said pressure-sensitive element and scales being relatively movable, a rockshaft operated by the pressure-sensitive element according to variations in altitude, a gear element carried by said rockshaft, a counter-shaft having a pinion thereon meshing with said gear element, a pointer shaft having a pinion thereon meshing with a gear on the counter-shaft, a second pointer shaft concentric with the first pointer shaft for slow rotation in synchronism therewith and having a gear element meshing with another gear element on the counter-shaft, pointers carried by each of the pointer shafts and cooperating with the scale means, reference indicating means separate from the scale means but operable with said pointers during setting and arranged to be set with said pointers for indicating a predetermined condition in numbers, and mounting means supporting the gear train and reference means, said mounting and actuator being relatively movable for setting the altimeter.

14. An indicating device including an actuator which is bodily movable along the axis of its indicating movement for setting, a plurality of pointers, cooperating scales for said pointers, concentric shafts for said pointers one of which is rotated by the actuator in setting and in normal indicating action, drive means interconnecting the pointer shafts to cause the second shaft to move in synchronism with the first-mentioned shaft both in setting and in normal indicating action, reference indicating means operable with said pointer means in setting action but remaining stationary during indicating action, said reference means being separate from the scales and arranged to be set for indicating a predetermined condition in whole numbers and independently of said scales, and means for bodily moving said actuator along the axis of its indicating movement to set the device.

15. An indicating device including an actuator which is movable for setting, concentric shafts one of which is rotated by the actuator both in setting and in normal indication action, drive means interconnecting the shafts to cause the second shaft to move in synchronism with the first-mentioned shaft both in setting and normal indicating action, pointer means for said shafts, scale means for the pointer means, a counter functionally related to the scale means and arranged to be set for indicating a predetermined condition in numbers and independently of said scale means, and actuating means separate from the drive means for operating the counter and simultaneously moving the actuator in setting the device.

16. An indicating device including an actuator, a plurality of scales of different values, pointer means for the respective scales movable by the actuator in different degrees according to the scales, the actuator being bodily movable substantially in the general direction of its operating axis to actuate the pointers for setting, and means for causing a relative movement between the pointer means and the scales in different degrees according to the respective scales in setting the device.

17. A sensitive altimeter including a pressure-sensitive element, a plurality of scales, individual pointers for the scales, reference indicating means comprising a counter separate from said scales but arranged to be viewed therewith and having a plurality of interconnected numbering elements operatively connected with said pointers and pressure-sensitive element for setting the same and indicating a predetermined altitude, drive means interconnecting the pointers and pressure-sensitive element to cause an indicating movement of the pointers by the pressure-sensitive element according to their scales, and actuator means to cause a relative movement between the pointers and scales and to simultaneously set the numbering elements of said counter for indicating the predetermined altitude so that a predetermined relation is established between the pointers and scales to produce a desired indication when the predetermined altitude shown by the numbering elements of said counter is reached.

18. In an altimeter having an expansible pressure responsive diaphragm, a pair of dials having different scales, a pair of pointers cooperating with said dials and intergeared so as to move in the ratio of the dial scales, and means connecting the pointers to the diaphragm for operating the former by the latter, the combination of means for setting said pointers so that they will indicate zero when a predetermined altitude is reached, said means including said connecting means and a knob operable from the front of the instrument for operating said pointers through said connecting means while the altimeter is indicating, and a counter having a plurality of interconnected numbering elements simultaneously operable with said setting means for indicating in numbers the predetermined altitude for which the altimeter has been set.

19. In an altimeter, pressure actuated means responsive to changes in altitude, indicating means operated by said pressure actuated means for indicating said altitude, means for presetting the altimeter for a predetermined altitude and operatively associated with said means so that the latter will give a desired indication when said predetermined altitude is reached, and other means for indicating in numerals the preset altitude, said other indicating means comprising a counter driven by said setting means and including a plurality of interconnected numbering elements each provided with a set of numerals and movable to select for exhibition a single numeral from each set, said selected numerals constituting a figure representing the predetermined altitude for which the altimeter is set.

20. The combination with an altimeter having means for setting it for a predetermined altitude or barometric pressure, of means for indicating said predetermined set altitude or barometric pressure in numerals, said indicating means comprising a counter operated by said setting means and including a plurality of interconnected numbering elements each provided with a set of numerals and movable to select for exhibition a single numeral from each set, said selected numerals constituting a figure representing the predetermined altitude or barometric pressure for which the instrument is set.

21. The combination with an altimeter having means for setting it for a predetermined altitude or barometric pressure, of means for indicating said predetermined set altitude or barometric pressure in numerals, said indicating means comprising a counter operated by said setting means and including a plurality of interconnected numbering wheels arranged in juxtaposition, each wheel having a set of numerals and being movable in either direction to select for exhibition a single numeral from each set, said selected numerals constituting a figure representing the predetermined altitude or barometric pressure for which the altimeter is set.

22. An indicating instrument including a device responsive to changes in conditions or operations, dial means having indicia thereon, movable pointer means operated by said device, manually operable setting means for causing a relative setting movement between said pointer means and dial means in order to set the instrument for a predetermined condition or operation whereby said pointer and dial means will give a desired indication when said condition or operation occurs or is reached, and a counter having a plurality of interconnected numbering elements operatively connected to and operated by said manually operable setting means independently of said change responsive device for indicating the preset condition or operation in numbers, whereby the present indication on the counter remains undisturbed during normal indicating action of the instrument.

23. In an indicating instrument, means responsive to changes in conditions or operations, indicating means including a dial and pointer means operated by said change responsive means for indicating said conditions or operations, manually operable setting means for causing relative setting movement between said dial and pointer means for presetting said instrument for a predetermined condition or operation, whereby said indicating means will give a desired indication when said predetermined condition or operation occurs or is reached, and other means for indicating the preset condition or operation by a group of numerals, said other means comprising a counter operatively connected to and operable by said manually operable setting means simultaneously with said first indicating means during setting, said counter including a plurality of interconnected numbering elements each provided with a set of numerals and movable to select for exhibition a single numeral from each set, said selected numerals constituting a figure representing the predetermined condition for which the instrument is set.

ADOLF URFER.